July 4, 1944.  J. F. WILCOX  2,352,988
ELECTRIC CIRCUIT
Filed May 30, 1942
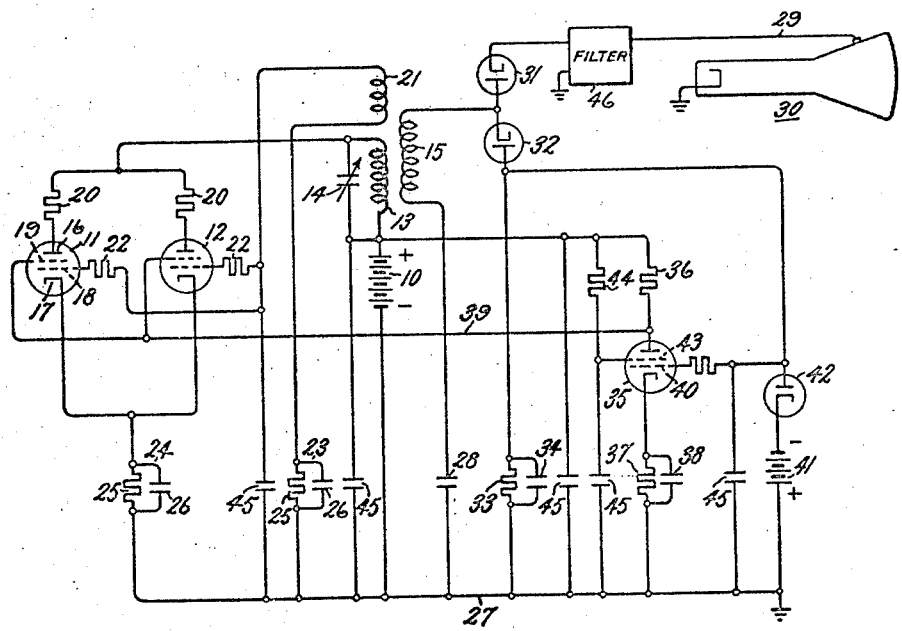
Inventor:
James F. Wilcox,
by Harry E. Dunham
His Attorney Patented July 4, 1944

2,352,988

UNITED STATES PATENT OFFICE 2,352,988

ELECTRIC CIRCUIT

James F. Wilcox, Schenectady, N. Y., assignor to General Electric Company, a corporation of New York Application May 30, 1942, Serial No. 445,137

9 Claims. (Cl. 171—97)

My invention relates to electric circuits and more particularly to an improved regulated high voltage supply circuit.

In many applications it is desirable to have a high voltage supply which remains relatively constant with changes in operating conditions, such as a change in load current, so that changes in supply voltage will not nullify to some extent changes in signal or control voltage. For example, variations in the anode voltage supplied to cathode ray tubes used in connection with television apparatus cause distortion of the picture. In accordance with the teachings of my invention I provide an improved high voltage direct current supply which is maintained at a relatively constant value with variations in load.

It is an object of my invention to provide a new and improved regulated direct current voltage supply.

It is another object of my invention to provide a new and improved circuit for converting a low direct current voltage to a high direct current voltage which is characterized by good regulation.

In accordance with the illustrated embodiment of my invention a low voltage source of direct current such as a battery, energizes the anode-cathode circuit of an oscillator. The inductive winding of a tuned circuit connected in the anode-cathode circuit of the oscillator electric valve is provided by the primary winding of a step-up transformer, the secondary winding of which is connected to the load circuit through a pair of reversely connected electric valves. Connected in the load circuit is an impedance element which provides a source of control voltage for an auxiliary electric valve dependent upon the magnitude of the load current. The conductivity of the auxiliary electric valve is utilized to control the voltage applied to the control members of the oscillator valves to vary the conductivity thereof in accordance with the load current in such a manner as to maintain substantially a constant output voltage with varying load current. Means are provided for limiting the amount of controlling action that can be produced by decreased load current to prevent the voltage from falling off at very light load.

My invention will be better understood by reference to the following description taken in connection with the accompanying drawing and its scope will be pointed out in the appended claims. In the drawing, the single figure is a schematic representation of one embodiment of my invention.

Referring now to the drawing, I have shown my invention embodied in a system for converting a relatively low direct current voltage to a regulated high direct current voltage. As illustrated, the supply voltage is provided by a battery 10 connected in series with a pair of electric discharge devices 11 and 12 and a parallel tuned circuit comprising an inductive winding 13 and a capacitor 14. The inductive winding 13, as illustrated, is the primary winding of a transformer having a secondary winding 15 and being provided with an air core or suitable powdered iron core type. The electric discharge devices 11 and 12 may be of any of the types well known in the art but are preferably of the high vacuum type and each comprises an anode 16, a cathode 17, a control member or grid 18, and a second control member or screen grid 19. The anode-cathode circuits of the electric discharge devices 11 and 12 are connected in parallel with a suitable resistor 20 connected in series with each of the anode-cathode circuits. These resistors reduce parasitic oscillations of very high frequency and also aid in forcing a division of current between the two valves. In order to effect operation of the discharge devices 11 and 12 and the parallel tuned circuit comprising winding 13 and capacitor 14 as an oscillator, means are provided for energizing the control members 18 in accordance with the current conducted by the winding 13. To this end the transformer 14 is provided with a third winding 21 having one terminal thereof connected with the control members 18 through suitable resistors 22 and the other terminal thereof connected to the cathodes of the electric discharge devices 11 and 12 through biasing circuits 23 and 24, each comprising a parallel connected resistor 25 and capacitor 26. Resistors 22 also tend to eliminate parasitic oscillations of high frequency. The biasing circuit 23 provides a bias dependent upon the rectified grid current and the biasing circuit 24 provides a negative bias depending upon the current conducted by the anode cathode circuit of the discharge devices 11 and 12 and serves as a means for limiting the anode-cathode current in the event that the feedback control including winding 21 fails to effect normal operation of the oscillator. The primary winding 13 is coupled with the secondary winding 15 having one terminal connected to a negative bus 27 through a capacitor 28 while the other terminal thereof is connected to a load circuit which may, for example, be the high voltage anode lead 29 of a cathode ray device, illustrated generally by the numeral 30, through a unilaterally conducting device, such as a two-element electron discharge device 31. This latter terminal of winding 15 is also connected to the negative bus 27 through an oppositely poled unilaterally conducting device 32 and a parallel connected resistor 33 and capacitor 34. The bus 27 and the cathode of the device 30 are preferably grounded as illustrated in the drawing.

Means for varying the intensity of the oscillations produced by the discharge devices 11 and 12 and cooperating tuned circuit comprising winding 13 and capacitor 14 in accordance with the current supplied to the load circuit is provided by an auxiliary electric discharge device 35 having the anode thereof connected with the positive terminal of battery 10 through a resistor 36. The cathode of valve 35 is connected to the bus 27 through a parallel circuit including resistor 37 and capacitor 38. The voltage of the anode of device 35 is impressed upon the control members or screen grids 19 of the discharge devices 11 and 12 by a conductor 39. It is apparent that the voltage of conductor 39 is dependent upon the conductivity of the valve 35. In order to control this voltage in accordance with the current supplied to the load circuit the control member 40 of device 35 is connected to be energized in accordance with the current supplied to the load circuit or device 30 and in the arrangement illustrated, is connected to the load circuit at a point between the anode of discharge device 32 and the resistor 33 so that the voltage of the control member 40 of the device 35 varies with the current conducted by resistor 33. The biasing circuit comprising resistor 37 and capacitor 38 serves to modify the conductivity of device 35 in accordance with the current conducted by the anode-cathode circuit thereof. In order to provide a minimum bias on the control member of device 35 independently of the current supplied to the load through resistor 33 I provide a source of unidirectional voltage such as a battery 41 and a unilaterally conductive device such as a two-element discharge device 42 connected in series between the negative bus 27 and the control member 40 of the device 35. Thus, when the bias impressed on the control member of device 35 by reason of the voltage across resistor 33 is less than the voltage of battery 41 the device 42 conducts and the control member is maintained at a definite minimum negative voltage. The valve 35 is provided with a second control member or screen grid 43 energized from the positive terminal of battery 10 through a resistor 44. In order to minimize the effect of the high frequency field produced by the oscillator, by-pass condensers 45 are connected across various parts of the control circuit, as illustrated in the drawing. A filter 46 is preferably connected in the direct current output circuit to minimize the high frequency ripple.

A better understanding of the features and advantages of my invention may be had by a brief consideration of the operation of the illustrated embodiment thereof. As previously mentioned, electric discharge devices 11 and 12, the battery 10 and the tuned circuit comprising winding 13 and capacitor 14, together with the feedback control including winding 21 provide an oscillator for inducing a high voltage in the winding 15. For example, with a 400-volt battery 10 the oscillator might be operated at 300 kilocycles and produce a voltage having a 12,500-volt peak in the secondary winding 15. From an inspection of the drawing it will be seen that when the lower terminal of winding 15 is positive the current will flow into capacitor 28, and through the resistor 33 and the anode-cathode circuit of discharge device 32. This will charge the condenser 28 so that the upper plate thereof is positive. During the next half cycle of the high frequency voltage of winding 15 the voltage of condenser 28 plus the voltage of winding 15 is impressed on the anode-cathode circuit of the device 30. Thus the capacitor 28 serves as a voltage doubling capacitor since its voltage obtained during one half cycle of high frequency voltage of secondary winding 15 is added to the voltage of the other half cycle and impressed on the load through the discharge device 31. The resistor 33 conducts the charging current of capacitor 28 which is the measure of the current supplied to the load and therefore produces a voltage drop between the bus 27 and the anode of the discharge device 32 which is dependent upon the current supplied to the load circuit. The control member 40 of the discharge device 35 in this way has a negative bias impressed thereon by resistor 33 which varies directly with the current supplied to the load. Since this bias is negative it decreases the conductivity of valve 35 in accordance with the load current and as the conductivity thereof decreases the potential of conductor 39 connected with the control grids of the electric valves of discharge devices 11 and 12 becomes more positive with respect to the cathode bus 27. In this way the intensity or amplitude of the oscillations supplied by the oscillation generator including the discharge devices 11 and 12 increases as the current supplied to the load increases and compensates for the internal voltage drop due to the increased load current. During the half cycle of high frequency voltage that current flows through discharge device 32 and capacitor 28 the voltage across the load is maintained by the distributed capacity thereof. In order to prevent the amplitude of the oscillations from decreasing too rapidly as the current supplied to the load decreases, provision is made for preventing the conductivity of the discharge device 35 from being reduced below a predetermined value by means of the minimum bias circuit comprising battery 41 and the unilaterally conducting device 42. The battery 41 might, for example, have a value of seven and one half volts and would then function to limit the minimum bias on the electric valve 35 to seven and one half volts. This prevents the conductor 39 from approaching too closely the potential of bus 27 when the current being conducted through resistor 33 is very small.

From the foregoing description it is seen that the present invention provides a simple circuit for producing a high voltage direct current output which is regulated in accordance with the load current and which also prevents falling off of the voltage at very light load by means of a minimum biasing circuit on the control electric valve for the oscillator.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an oscillation generator comprising an electron discharge device having a pair of control members, means for energizing one of said control members to maintain said generator in a state of oscillation, means for rectifying the oscillations produced by said generator to produce a direct current voltage, a load circuit connected to be energized in accordance with said direct current voltage, and means responsive to the current supplied to said load circuit for energizing the other of said control members to vary the amplitude of the oscillations in accordance with the current supplied to said load circuit.

2. In combination, an oscillation generator comprising an electron discharge device having a pair of control members, means for energizing one of said control members to maintain said generator in a state of oscillation, means for rectifying the oscillations produced by said generator to produce a direct current voltage, a load circuit connected to be energized by said direct current voltage, and means including an auxiliary electric valve for effecting variable energization of the second of said control members in accordance with the current supplied to said direct current load circuit.

3. In combination, an oscillation generator comprising an electric discharge device having a pair of control members, means for energizing one of said control members to maintain said generator in a state of oscillation, means for rectifying the oscillations produced by said generator to produce a direct current voltage, a load circuit connected to be energized by said direct current voltage, an auxiliary electric discharge device having a control member energized in accordance with an electrical condition of said load circuit, and means for energizing the second of the control members of said electron discharge device in accordance with the conductivity of said auxiliary electric valves in order to maintain a predetermined characteristic of said electrical condition.

4. In combination, an oscillation generator for producing high frequency oscillations, means for rectifying said oscillations to provide a direct current voltage, a load circuit energized from said direct current voltage, and means for controlling said oscillation generator in response to an electrical condition of said load circuit to vary the amplitude of the oscillations produced by said generator to maintain said direct current voltage substantially constant.

5. In combination, a source of voltage, means for converting said source of voltage to a regulated direct current voltage including electric valve means having a control member, a load circuit energized from said direct current voltage, means including an auxiliary electric valve having a control member for variably energizing the control member of said electric valve means to maintain said direct current voltage substantially constant, said means for energizing the control member of said auxiliary electric valve comprising means for impressing a variable voltage component thereon dependent upon the current supplied to said direct current load circuit, and means for maintaining a substantially constant energization of the control member of said auxiliary valve when the current supplied to said load circuit falls below a predetermined minimum value.

6. In combination, a load circuit, an oscillation generator, means for rectifying the output of said generator to supply a high direct current voltage to said load circuit, means for regulating said voltage including an auxiliary electric valve having a control member, means for variably energizing the control member of said auxiliary valve in accordance with an electrical characteristic of said load circuit, means for maintaining a substantially constant energization of said control member when said variable energization falls below a predetermined value, and means for controlling the amplitude of the oscillations produced by said generator in accordance with the conductivity of said auxiliary valve.

7. In combination, a direct-current load circuit, means for energizing said load circuit comprising an oscillation generator including a transformer and an electron discharge device having a control member, means for energizing said control member to maintain said generator in a state of oscillation, a secondary winding associated with said transformer, means including a unilaterally conducting device and a condenser connected with said secondary winding for rectifying and doubling the voltage of said winding, and means responsive to the charging current supplied to said capacitor for modifying the conductivity of said electric discharge device to control the amplitude of the oscillations produced by said generator in accordance with the current supplied to said capacitor and thereby maintain a predetermined characteristic of said load circuit with varying load.

8. In combination, an oscillation generator comprising a source of voltage, an inductive winding, an electron discharge device having an anode, a cathode and a pair of control members, means connecting said inductive winding and source of voltage and the anode-cathode circuit of said electric discharge device in a closed circuit, means for controlling one of said control members in accordance with the voltage of said inductive winding, a second inductive winding coupled with said inductive winding, a capacitor connected wth one terminal of said inductive winding, a load circuit and a unilaterally conducting device connected to be energized from said capacitor and said inductive winding in series, a second circuit connected across said capacitor and said inductive winding including an oppositely poled unilaterally conducting device and an impedance element, and means for controlling the second of said control members in accordance with the current conducted by said impedance element to vary the amplitude of the oscillations produced by said oscillation generator in accordance with the current conducted by said impedance element.

9. In combination, an oscillation generator including an inductive winding and an electric discharge device having a pair of control members, means for impressing a voltage on one of said control members to maintain said generator in oscillating condition to produce a voltage of high frequency and amplitude in said winding, a capacitor connected in series with said winding, a load circuit and a unilaterally conducting device connected to be energized by the voltage of said capacitor and said winding, and a second circuit connected across said series connected winding and capacitor including an impedance element and a unilaterally conducting device oppositely poled with respect to said first mentioned unilaterally conducting device, an electric valve, means for controlling said electric valve in accordance with the current conducted by said impedance element, and means energized in accordance with the conductivity of said electric valve and connected with the other of said control members to vary the amplitude of the oscillations of said generator to maintain the load voltage substantially constant independently of the load current.

JAMES F. WILCOX.